United States Patent [19]

Wen et al.

[11] Patent Number: 5,216,709

[45] Date of Patent: Jun. 1, 1993

[54] ELECTRONIC DEVICE FOR PROVIDING INFORMATION RELATED TO AN INPUT TELEPHONE NUMBER

[75] Inventors: Sayling Wen; Ching-Sung Chang; Dai-Shui Ho, all of Taipei, Taiwan

[73] Assignee: Inventa Electronics Co., Ltd., Taipei, Taiwan

[21] Appl. No.: 815,338

[22] Filed: Dec. 27, 1991

[51] Int. Cl.⁵ .............................................. H04M 1/26
[52] U.S. Cl. .................................... 379/354; 379/355; 379/356
[58] Field of Search ............... 379/352, 354, 355, 356, 379/387

[56] References Cited

U.S. PATENT DOCUMENTS 4,304,968  12/1981  Klausner .............................. 379/355
4,511,764  4/1985  Nakayama et al. ................... 379/354

FOREIGN PATENT DOCUMENTS 0168754  9/1984  Japan ................................... 379/354
0175256  10/1985  Japan ................................... 379/354

Primary Examiner—Curtis Kuntz
Assistant Examiner—M. Shehata
Attorney, Agent, or Firm—Ladas & Parry

[57] ABSTRACT

An electronic device for providing information related to an input telephone number includes a keyboard unit for providing an input telephone number and a memory unit for storing an IDDD code and a database including country code entries, country name entries which correspond to the country code entries, area code entries, area name entries which correspond to the country code entries, and information related to each of the country name and the area name entries. A central processing unit receives the input telephone number from the keyboard unit and compares the received input telephone number with the contents of the memory unit. The central processing unit then controls a display unit to show the input telephone number, the country name entry and the area name entry corresponding to the input telephone number, and the information related to the country name entry and the area name entry corresponding to the input telephone number. The electronic device is intended for use with another electronic device which is capable of dialing or storing telephone numbers.

3 Claims, 6 Drawing Sheets

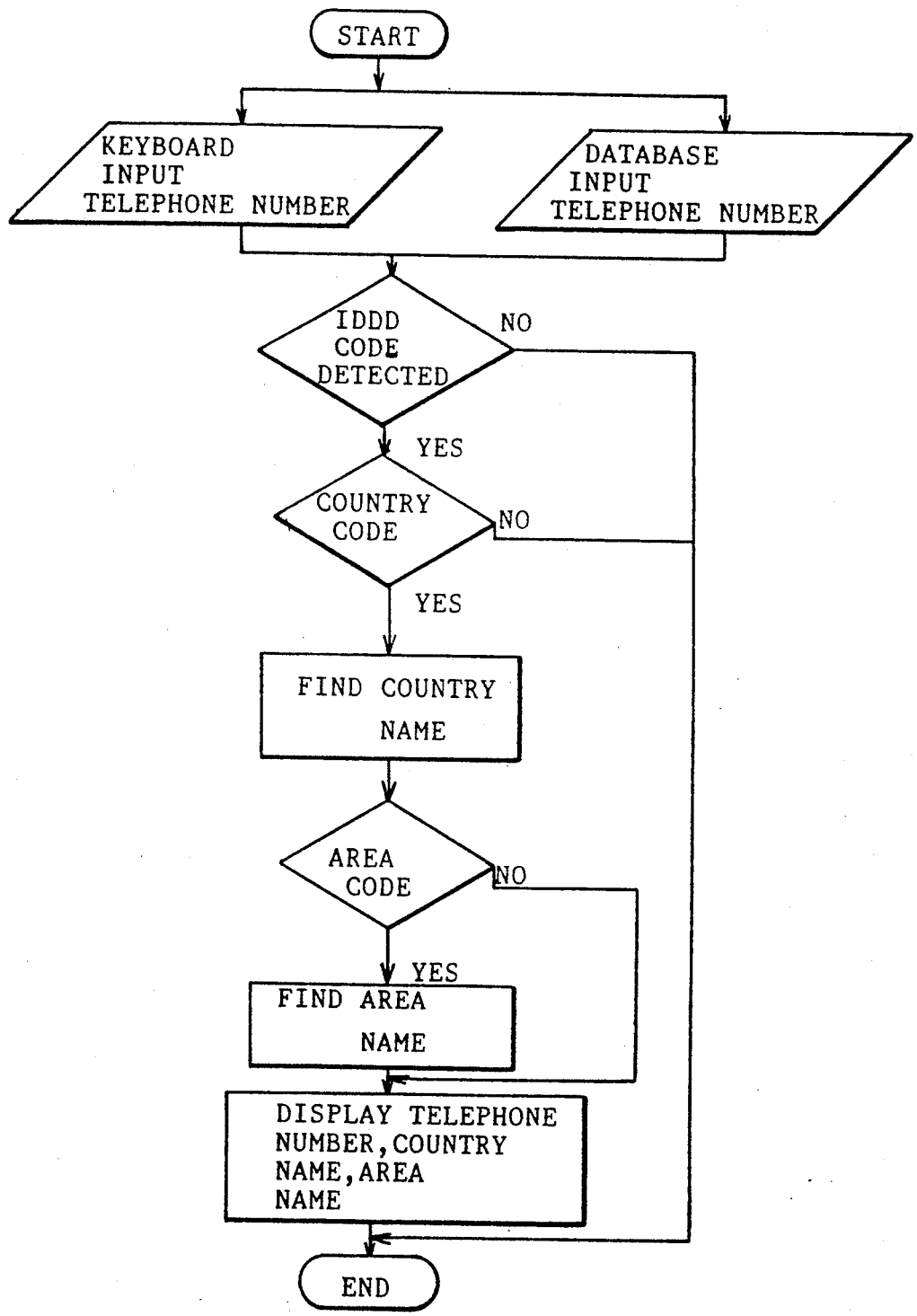
F I G. 4

```
TELEPHONE NUMBER:   00214077508057
COUNTRY  : U. S. A.
AREA     : PALM BEACH , FLORIDA
DISPLAY INFORMATION? (Y/N)

10:00
```

F I G. 5A

```
1. CURRENT TIME: 22:00
2. TIME DIFFERENCE: 12 HOURS
3. TEMPERATURE:    24-35°C
4. EXCHANGE RATE: 27:1
                                   ▼
                                  10:00
```

F I G. 5B

```
5. PRICE INDEX: 90
6. INFLATION RATE: 4.2%
7. LOCAL REPRESENTATIVE: AMERICAN INSTITVTE IN TAIWAN
   ADDRESS:NO.145,HSIN YI ROAD, SECTION 3
   TEL    : 8823423                              10:00
```

F I G. 5C

```
8. NEAREST AIRPORTS:
   A. PALM BEACH AIRPORT(PBI)
   B. FT. LAUDERDALE (FLL)                       10:00
```

F I G. 5D

ELECTRONIC DEVICE FOR PROVIDING INFORMATION RELATED TO AN INPUT TELEPHONE NUMBER

BACKGROUND OF THE INVENTION

1. Field of the Invention

The invention relates to an electronic device which is to be used in combination with another electronic device that is capable of dialing or storing telephone numbers, more particularly to an electronic device for providing information related to an input telephone number.

2. Description of the Related Art

Present electronic devices which can dial or store telephone numbers are not capable of providing supplementary information related to an input telephone number. The supplementary information may include the current time, the average temperature and the time difference at the country/area corresponding to the input telephone number.

SUMMARY OF THE INVENTION

Therefore, the objective of the present invention is to provide an electronic device for supplying information related to an input telephone number.

More specifically, the objective of the present invention is to provide an electronic device which is to be used in combination with another electronic device that is capable of dialing or storing telephone numbers, said electronic device identifying the country and area corresponding to an input telephone number and displaying information related to the country and area corresponding to the input telephone number.

Accordingly, the preferred embodiment of an electronic device of the present invention is used to provide information related to an input telephone number and comprises:

a keyboard means for providing an input telephone number having an international direct distance dialing (IDDD) code portion, a country code portion, an area code portion and an area telephone number portion;

a memory means for storing a local IDDD code and a database including country code entries, country name entries which correspond to the country code entries, area code entries, area name entries which correspond to the area code entries, and information related to each of the country name and the area name entries;

a central processing means for receiving the input telephone number from the keyboard means, said central processing means comparing the IDDD code portion of the input telephone number with the local code stored in the memory means, said central processing means determining, independent of the contents of said area telephone number portion, the country name entry and the area name entry corresponding to the country code portion and area code portion of the input telephone number by comparing the country code portion and the area code portion of the input telephone number with the country code entries and the area code entries of the database when the IDDD code portion tallies with the local IDDD code stored in the memory means;

a display unit which is controlled by the central processing means so as to show the input telephone number, the country name entry and the area name entry corresponding to the input telephone number, and the information related to the country name entry and the area name entry corresponding to the input telephone number;

a clock means for providing a current time output to the central processing means, said central processing means controlling the display unit to show the current time output thereon; and an auxiliary power supply means for supplying electric power to the memory means and to the clock means when power outage occurs so as to prevent loss of data.

BRIEF DESCRIPTION OF THE DRAWINGS

Other features and advantages of the present invention will become apparent in the following detailed description of the preferred embodiment, with reference to the accompanying drawings, of which:

FIG. 4 is a flowchart of a telephone number identifying operation executed by the preferred embodiment; and FIGS. 5A, 5B, 5C and 5D illustrate sample data which can be seen on a liquid crystal display unit of the preferred embodiment after execution of the telephone number identifying operation.

DETAILED DESCRIPTION OF THE PREFERRED EMBODIMENT

Figure 1:
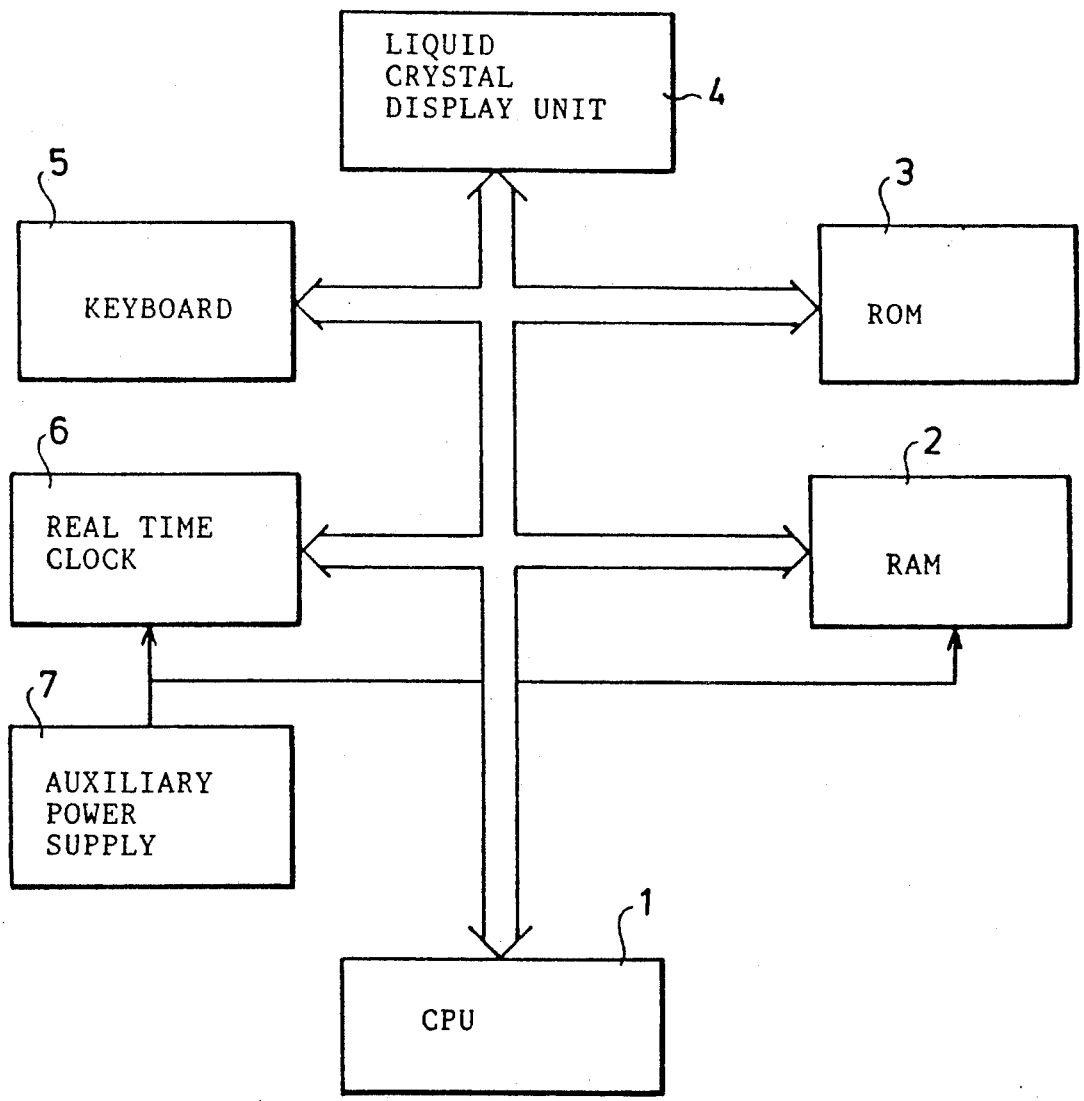
FIG. 1 is a schematic circuit block diagram of the preferred embodiment of an electronic device for providing information related to an input telephone number.

Referring to FIG. 1, the preferred embodiment of an electronic device for providing information related to an input telephone number is shown to comprise a central processing unit (CPU) (1), a random access memory (RAM) unit (2), a read only memory (ROM) unit (3), a liquid crystal display (LCD) unit (4), a keyboard unit (5), a real time clock (6) for providing a current time output to the CPU (1), and an auxiliary power supply (7).

The CPU (1) retrieves software instructions from the ROM unit (3) and is responsible for all decision making operations and for other system operations, such as the scanning of data and control inputs from the keyboard unit (5), the display of data on the LCD unit (4), the identification of an input telephone number, the comparison of input data with data in the memory units (2, 3), etc. The RAM unit (2) is used to store keyboard data inputs and system variables obtained during the course of operation of the preferred embodiment. Aside from the system software, the ROM unit (3) also contains a database including country code entries, country name entries corresponding to the country code entries, area code entires, area name entries corresponding to the area code entries, and information related to each of the country name and area name entries such as time differences, average temperature, etc. The system data and information related to an input telephone number from the keyboard unit (5) are shown on the LCD unit (4). The CPU (1) also controls the LCD unit (4) so as to show the current time output from the real time clock (6) thereon.

Figure 2:
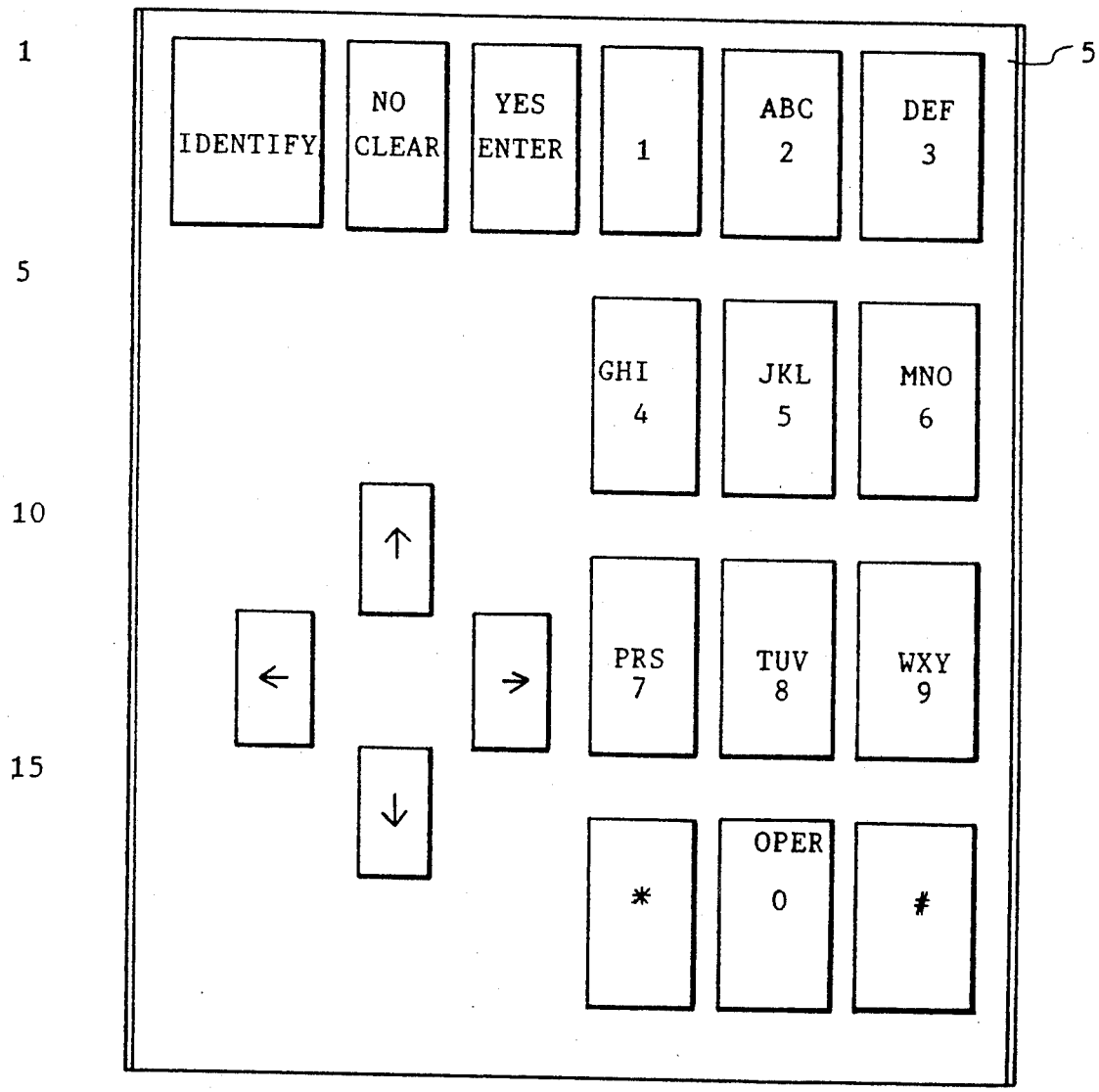
FIG. 2 is an illustration of the key layout of a keyboard unit of the preferred embodiment.

The keyboard unit (5) is used to key in command and data inputs and for setting the real time clock (6). FIG. 2 illustrates a preferred key layout of the keyboard unit (5). The keyboard unit (5) has numeric keys similar to those provided in a conventional push-button telephone set. The keyboard unit (5) is further provided with several control keys, such as an "Enter" control key for storing keyed-in data in the RAM unit (2), a "Clear" control key for deleting a data entry from the RAM unit (2), an "Identify" control key operated to initiate the execution of a telephone number identifying operation, a " ↑ " cursor control key, a " ↓ " cursor control key, a "→" cursor control key and a "←" cursor control key. The cursor control keys are operated so as to move a cursor on the LCD unit (4). The "Enter" and "Clear" control keys also serve as "Yes" and "No" inputs to the CPU (1), as will be detailed in the succeeding paragraphs.

The real time clock (6) has clocking and time data storage functions. The LCD unit (4) displays the current time output from the real time clock (6), and the keyboard unit (5) is used to set the real time clock (6). The preferred embodiment uses CMOS technology to minimize the energy consumption of the same. When power outage of the main power source occurs, the auxiliary power supply (7) is activated so as to provide electric power to the RAM unit (2) and to the real time clock (6), thereby preventing loss of data.

Figure 3:
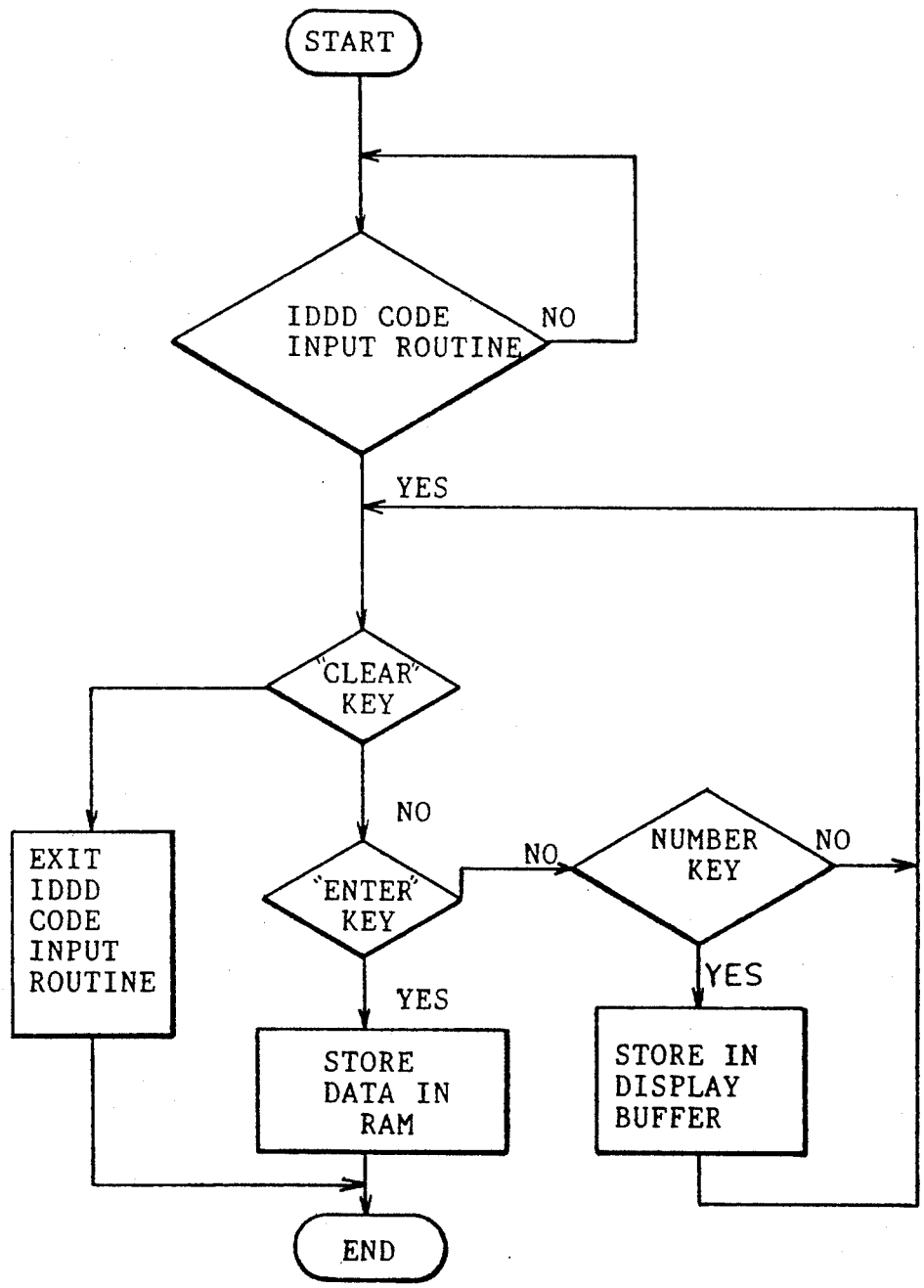
FIG. 3 is a flowchart of an international direct distance dialing (IDDD) code input routine which is executed by a central processing unit of the preferred embodiment.

International numbering is an extension of national numbering systems. The telephone numbers are usually preceded by an international direct distance dialing (IDDD) code to obtain access to the international network. Since the IDDD code differs in most countries, it is important that the local IDDD code should be keyed in and stored in the RAM unit (2) before using the preferred embodiment. The country and area codes, however, are non-varying data and are stored in the ROM unit (3). Referring to FIG. 3, when setting the local IDDD code, the keyboard unit (5) is first operated so as to prepare the CPU (1) to execute an IDDD code input routine. The numbers corresponding to the local IDDD code are then keyed in, after which the "Identify" control key is pressed so as to display the keyed-in numbers on the LCD unit (4). The "Enter" control key is then pressed so as to store the local IDDD code in the RAM unit (2). If the "Clear" control key is pressed, the keyed-in numbers are not stored in the RAM unit (2) and the CPU (1) exits the IDDD code input routine.

FIG. 4 is a flowchart illustrating the telephone number identifying operation of the preferred embodiment. The input telephone number to be identified may be a keyboard input or may be a pre-stored telephone number stored in a database. The "Identify" control key is then pressed to initiate the execution of the telephone number identification routine. The CPU (1) first checks for the presence of a proper IDDD code by comparing the IDDD code portion of the input telephone number with the local IDDD code stored in the RAM unit (2). When a proper IDDD code is detected, the CPU (1) then determines the country name and the area name corresponding to the country code portion and the area code portion of the input telephone number by comparing the country code portion and the area code portion of the input telephone number with the country code and area code entries of the database stored in the ROM unit (3). The CPU (1) then controls the LCD unit (4) to show the input telephone number, the country name and the area name corresponding to the input telephone number. The CPU (1) then retrieves from the ROM unit (3) information related to the country name/area name corresponding to the input telephone number. The information retrieved may be related to travel, business or education and may include the current time in that area, the local time difference, the average temperature, the nearest airports, etc.. Since, after proper IDDD identification, only the country code portion and the area code portion of the inputted complete telephone number are processed, and data from the database is retrieved relating to these two portions, the invention functions independent of the contents of the area telephone number portion.

If there is a relatively large volume of information available for the country/area corresponding to the input telephone number, the information may be classified into different categories. The keyboard unit (5) is then operated so as to select one of the available categories to permit viewing of information relevant to the chosen category on the LCD unit (4). The procedure for achieving this function is known in the art and will not be detailed further.

The following is an illustrative example to facilitate understanding of the operation of the preferred embodiment: If the preferred embodiment is to be used in Taiwan (where the local IDDD code is 002), the IDDD code setting routine is first executed so as to store the number 002 in the RAM unit (2). The preferred embodiment executes the telephone number identification routine when the "Identify" control key is pressed after a telephone number, such as 002 1 407 7508057, is keyed in. After the CPU (1) has detected the local IDDD code 002, it then determines the country name and area name corresponding to the input telephone number. The input telephone number is deciphered as follows:

002—IDDD code portion
1—country code portion
407—area code portion
08057—area telephone number portion After comparing the country code portion and the area code portion of the input telephone number with the country code entries and the area code entries of the database stored in the ROM unit (3), the number "1" is found to correspond to the country "United States" while the number "407" is found to correspond to the area "Palm Beach, Florida." The CPU (1) then controls the LCD unit (4) to display the input telephone number and the country name and the area name corresponding to the input telephone number, as shown in FIG. 5A. Note that the current local time is also shown on the lower right-hand corner of the LCD unit (4). The user is then asked if it is desirable to display more information related to the input telephone number. The "Enter" control key is pressed if the answer is yes, and the LCD unit (4) displays additional information related to the area of Palm Beach, Florida, as shown in FIGS. 5B, 5C and 5D.

Note that because of the limited viewing space of the LCD unit (4), it is necessary to operate the arrow keys on the keyboard unit (5) so as to view all of the information related to Palm Beach, Florida.

Also, note that, since the area telephone number portion is not processed, the same information will be displayed on the LCD unit (4) for inputted telephone numbers having the same country code portion and area code portion, independent of the area telephone number portion. For example, the LCD unit (4) will display the same information for the inputted telephone number 002 1 407 7508057 as for the number 002 1 407 1234567.

The preferred embodiment is intended for use in electronic devices which are capable of dialing or storing telephone numbers, such as telephones, facsimile machines, modems and electronic data banks.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electronic device for providing information related to an input telephone number, comprising:

means for providing an input telephone number having an international direct distance dialing (IDDD) code portion, a country code portion, an area code portion and an area telephone number portion;

a memory means for storing a local IDDD code and database including country code entries, country name entries which correspond to said country code entries, area code entries, area name entries which correspond to said area code entries, and information related to each of said country name and said area name entries;

a central processing means for receiving said input telephone number from said keyboard means, said central processing means comparing said IDDD code portion of said input telephone number with said local IDDD code stored in said memory means, said central processing means determining, independent of the contents of said area telephone number portion, said country name entry and said area name entry corresponding to said country code portion and said area code portion of said input telephone number by comparing said country code portion and said area code portion with said country code entries and said area code entries of said database when said IDDD code portion tallies with said local IDDD code stored in said memory means; and a display unit which is controlled by said central processing means so as to show said input telephone number, said country name entry and said area name entry corresponding to said input telephone number, and said information related to said country name entry and said area name entry corresponding to said input telephone number.

2. The electronic device as claimed in claim 1, further comprising a clock means for providing a local current time output to said central processing means, said central processing means controlling said display unit to show said current time output thereon and the current time in the area identified by said area name entry.

3. The electronic device as claimed in claim 2, further comprising an auxiliary power supply means for supplying electric power to said memory means and to said clock means when power outage occurs so as to prevent loss of data.

* * * * *